US011886296B2

United States Patent
Chen et al.

(10) Patent No.: US 11,886,296 B2
(45) Date of Patent: Jan. 30, 2024

(54) INHIBITING RECOMMENDATION OF DRIVER INSTALLATIONS FOR DRIVERS THAT ARE LIKELY TO CAUSE A SYSTEM FAILURE

(71) Applicant: Dell Products L.P., Round Rock, TX (US)

(72) Inventors: Wei-Ta Chen, Pflugerville, TX (US); Landon Martin Chambers, Round Rock, TX (US); John Li, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 323 days.

(21) Appl. No.: 17/186,648

(22) Filed: Feb. 26, 2021

(65) Prior Publication Data

US 2022/0276931 A1 Sep. 1, 2022

(51) Int. Cl.
*G06F 11/14* (2006.01)
*G06F 11/36* (2006.01)
*G06F 8/61* (2018.01)

(52) U.S. Cl.
CPC ............ *G06F 11/1433* (2013.01); *G06F 8/61* (2013.01); *G06F 11/366* (2013.01); *G06F 2201/865* (2013.01)

(58) Field of Classification Search
CPC ...... G06F 8/61; G06F 11/1433; G06F 11/366; G06F 2201/865
See application file for complete search history.

(56) References Cited

U.S. PATENT DOCUMENTS

| | | | | |
|---|---|---|---|---|
| 10,019,255 | B1* | 7/2018 | Greenfield | G06F 11/1433 |
| 2003/0229890 | A1* | 12/2003 | Lau | H04L 67/306 |
| | | | | 717/174 |
| 2006/0080658 | A1* | 4/2006 | Marion | G06F 11/36 |
| | | | | 717/177 |
| 2007/0097400 | A1* | 5/2007 | Yasui | G06F 3/1204 |
| | | | | 358/1.15 |

(Continued)

OTHER PUBLICATIONS

Dell EMC, "SupportAssist for Home PCs Version 3.8.1," User's Guide, Feb. 2021, 51 pages.

*Primary Examiner* — S. Sough
*Assistant Examiner* — Zheng Wei
(74) *Attorney, Agent, or Firm* — Ryan, Mason & Lewis, LLP

(57) ABSTRACT

An apparatus comprises a processing device that is configured to obtain information about driver installations of a given driver on a plurality of computing devices and to obtain information about system failures from the plurality of computing devices. The processing device is further configured to determine a correlation between the driver installations and the system failures and to determine that the given driver is likely to cause a system failure based at least in part on the determined correlation between the driver installations and the system failures. The processing device is further configured to provide an indication that the given driver is likely to cause a system failure to a given computing device. The indication is configured to cause the given computing device to inhibit a presentation of a recommendation to install the given driver to a user of the given computing device.

20 Claims, 10 Drawing Sheets

(56) References Cited

U.S. PATENT DOCUMENTS

| | | | |
|---|---|---|---|
| 2008/0225870 A1* | 9/2008 | Sundstrom | H04L 67/306 370/465 |
| 2016/0179498 A1* | 6/2016 | Das | G06F 8/65 717/171 |
| 2020/0026504 A1* | 1/2020 | Hu | G06F 3/0482 |
| 2021/0132936 A1* | 5/2021 | Arakkal | G06F 8/65 |
| 2022/0156631 A1* | 5/2022 | Kanso | G06F 8/60 |
| 2022/0197770 A1* | 6/2022 | Tan | G06F 8/65 |

* cited by examiner

FIG. 3

| Computing Device Type | Installation Count | Computing Device Count | Computing Device Ratio | ASU Computing Device Count |
|---|---|---|---|---|
| TYPE 1 | 20000000 | 4000000 | 40% | 21000000 |
| TYPE 2 | 12000000 | 2000000 | 20% | 12000000 |
| TYPE 3 | 5000000 | 1200000 | 12% | 6250000 |
| TYPE 4 | 4200000 | 1000000 | 10% | 5300000 |
| TYPE 5 | 3100000 | 700000 | 7% | 400000 |
| TYPE 6 | 2750000 | 500000 | 5% | 320000 |
| TYPE 7 | 1750000 | 300000 | 3% | 180000 |
| TYPE 8 | 1500000 | 300000 | 3% | 140000 |

FIG. 4

| Computing Device Type | Failure Instances | Computing Device Count | Computing Device Ratio | ASU Computing Device Count |
|---|---|---|---|---|
| TYPE 1 | 18000000 | 4000000 | 40% | 21000000 |
| TYPE 2 | 6000000 | 2000000 | 20% | 12000000 |
| TYPE 3 | 4500000 | 1200000 | 12% | 6250000 |
| TYPE 4 | 4000000 | 1000000 | 10% | 5300000 |
| TYPE 5 | 2750000 | 700000 | 7% | 400000 |
| TYPE 6 | 2250000 | 500000 | 5% | 320000 |
| TYPE 7 | 2000000 | 300000 | 3% | 180000 |
| TYPE 8 | 1500000 | 300000 | 3% | 140000 |

| Statistical Power | 80% | 85% | 90% | 95% | >95% | >>95% |
|---|---|---|---|---|---|---|
| Average Sample Size | 100 | 120 | 180 | 230 | 450 | 1250 |
| 1-Year Driver Platform Banned | 20 | 15 | 8 | 5 | 4 | 4 |
| 3-Year Driver Platform Banned | 40 | 25 | 15 | 8 | 6 | 5 |

FIG. 7

Sample Size at Statistical Power 95 by Device Type

| | |
|---|---|
| Type 1 | 305 |
| Type 2 | 210 |
| Type 3 | 190 |
| Type 4 | 195 |
| Type 5 | 165 |
| Type 6 | 245 |
| Type 7 | 200 |
| Type 8 | 330 |

FIG. 8

| Release Range: Date 1 – Date 2 | Installation Count | Size at Power 80 | Size at Power 85 | Size at Power 90 | Size at Power 95 |
|---|---|---|---|---|---|
| | | Average 100 | Average 120 | Average 180 | Average 230 |
| All Platform-Driver Combos, on All Device Types, With All Failure Rates. | | | | | |
| Installation Size Filling Period: (Unit: Day) | Longest 95th | 190 | 200 | 210 | 230 |
| | 75th | 40 | 45 | 50 | 55 |
| | Median 50th | 8 | 10 | 12 | 15 |
| | 25th | 3 | 3 | 4 | 5 |
| | Shortest 5th | 1 | 1 | 1 | 1 |
| Installation Rate: (Unit: Installation Count / Day) | Fastest 95th | 140 | 150 | 150 | 165 |
| | 75th | 25 | 30 | 35 | 40 |
| | Median 50th | 10 | 10 | 12 | 15 |
| | 25th | 2 | 2 | 3 | 4 |
| | Slowest 5th | 0 | 1 | 1 | 1 |

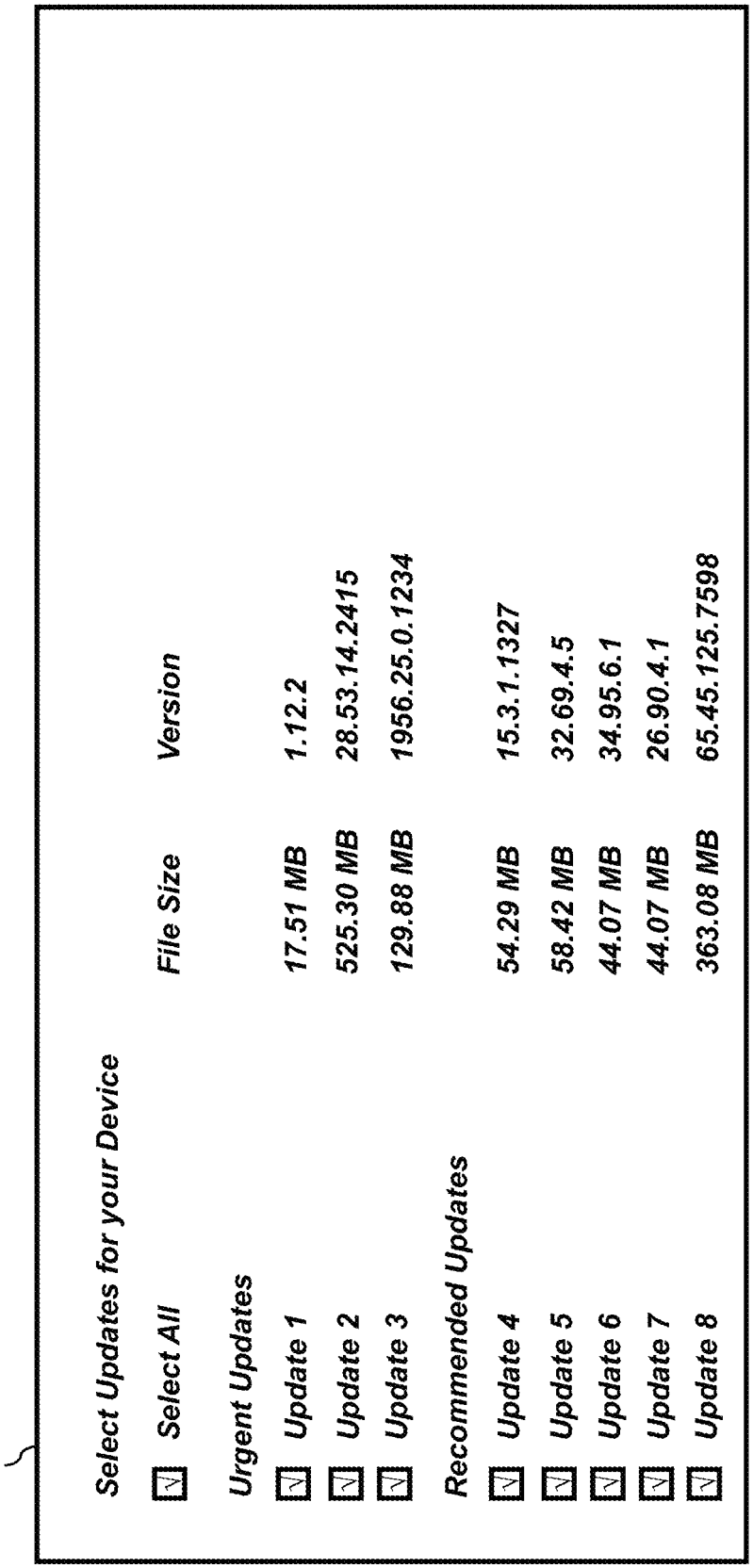

Select Updates for your Device

| | | File Size | Version |
|---|---|---|---|
| ☑ | Select All | | |
| Urgent Updates | | | |
| ☑ | Update 1 | 17.51 MB | 1.12.2 |
| ☑ | Update 2 | 525.30 MB | 28.53.14.2415 |
| ☑ | Update 3 | 129.88 MB | 1956.25.0.1234 |
| Recommended Updates | | | |
| ☑ | Update 5 | 58.42 MB | 32.69.4.5 |
| ☑ | Update 6 | 44.07 MB | 34.95.6.1 |
| ☑ | Update 7 | 44.07 MB | 26.90.4.1 |
| ☑ | Update 8 | 363.08 MB | 65.45.125.7598 |

FIG. 11

| Operating System | Device Type | Platform | Driver Identifier | Failure Rate (%) | Installed Assets | Failed Assets |
|---|---|---|---|---|---|---|
| OS A | Type 3 | Platform 1 | GBHK2 | 6.24 | 10415 | 650 |
| OS A | Type 3 | Platform 1 | AHG23 | 3.36 | 53500 | 1800 |
| OS A | Type 3 | Platform 2 | AHG23 | 0.94 | 20320 | 190 |
| OS A | Type 6 | Platform 3 | BLSRG | 1.04 | 1640 | 17 |
| OS A | Type 6 | Platform 3 | HTCD2 | 1.22 | 4935 | 60 |
| OS A | Type 6 | Platform 3 | P3B5YS | 0.28 | 7800 | 22 |

1100

INHIBITING RECOMMENDATION OF DRIVER INSTALLATIONS FOR DRIVERS THAT ARE LIKELY TO CAUSE A SYSTEM FAILURE

FIELD

The field relates generally to computer systems, and more particularly to driver updates in computer systems.

BACKGROUND

System failures are an issue that has long plagued various operating systems. A common cause of a failure is a buggy or incompatible driver update. When a failure occurs, the operating system typically freezes user inputs and presents an error message on a display before restarting the system and creating a dump file with information about the failure. Some support assistance tools recommend the latest driver updates to user devices. Although these new driver updates may be tested internally before deployment, they are often tested only on the latest computer platforms. Therefore, when users with older platforms update their drivers to the latest versions, unforeseen hardware-software incompatibilities may lead to the occurrence of a failure, lost data, lost work progress and user frustration.

SUMMARY

In one embodiment, an apparatus comprises at least one processing device comprising a processor coupled to memory. The at least one processing device is configured to obtain information about driver installations of a given driver on a plurality of computing devices from the plurality of computing devices and to obtain information about system failures from the plurality of computing devices. The at least one processing device is further configured to determine a correlation between the driver installations of the given driver on the plurality of computing devices and the system failures and to determine that the given driver is likely to cause a system failure based at least in part on the determined correlation between the driver installations of the given driver on the plurality of computing devices and the system failures. The at least one processing device is further configured to provide an indication that the given driver is likely to cause a system failure to a given computing device. The indication is configured to cause the given computing device to inhibit a presentation of a recommendation to install the given driver to a user of the given computing device.

These and other illustrative embodiments include, without limitation, apparatus, systems, methods and processor-readable storage media.

BRIEF DESCRIPTION OF THE DRAWINGS

FIG. 3 illustrates a table comprising example information about driver installations in an illustrative embodiment.

FIG. 4 illustrates a table comprising example information about system failures in an illustrative embodiment.

FIG. 7 illustrates a table comprising example information about sample sizes for various device types at a statistical power of 95% in an illustrative embodiment.

FIG. 8 illustrates a table comprising example information about the installation size filling period and installation rate for corresponding statistical power values in an illustrative embodiment.

FIG. 9 illustrates an example graphical user interface showing recommended driver installations in an illustrative embodiment.

FIG. 10 illustrates an example graphical user interface showing recommended driver installations with drivers that are likely to cause a system failure having been inhibited from recommendation in an illustrative embodiment.

FIG. 11 illustrates a table comprising information for an example scenario in an illustrative embodiment.

DETAILED DESCRIPTION

Illustrative embodiments will be described herein with reference to exemplary information processing systems and associated computers, servers and other processing devices. It is to be appreciated, however, that these and other embodiments are not restricted to the particular illustrative system and device configurations shown.

Figure 1:
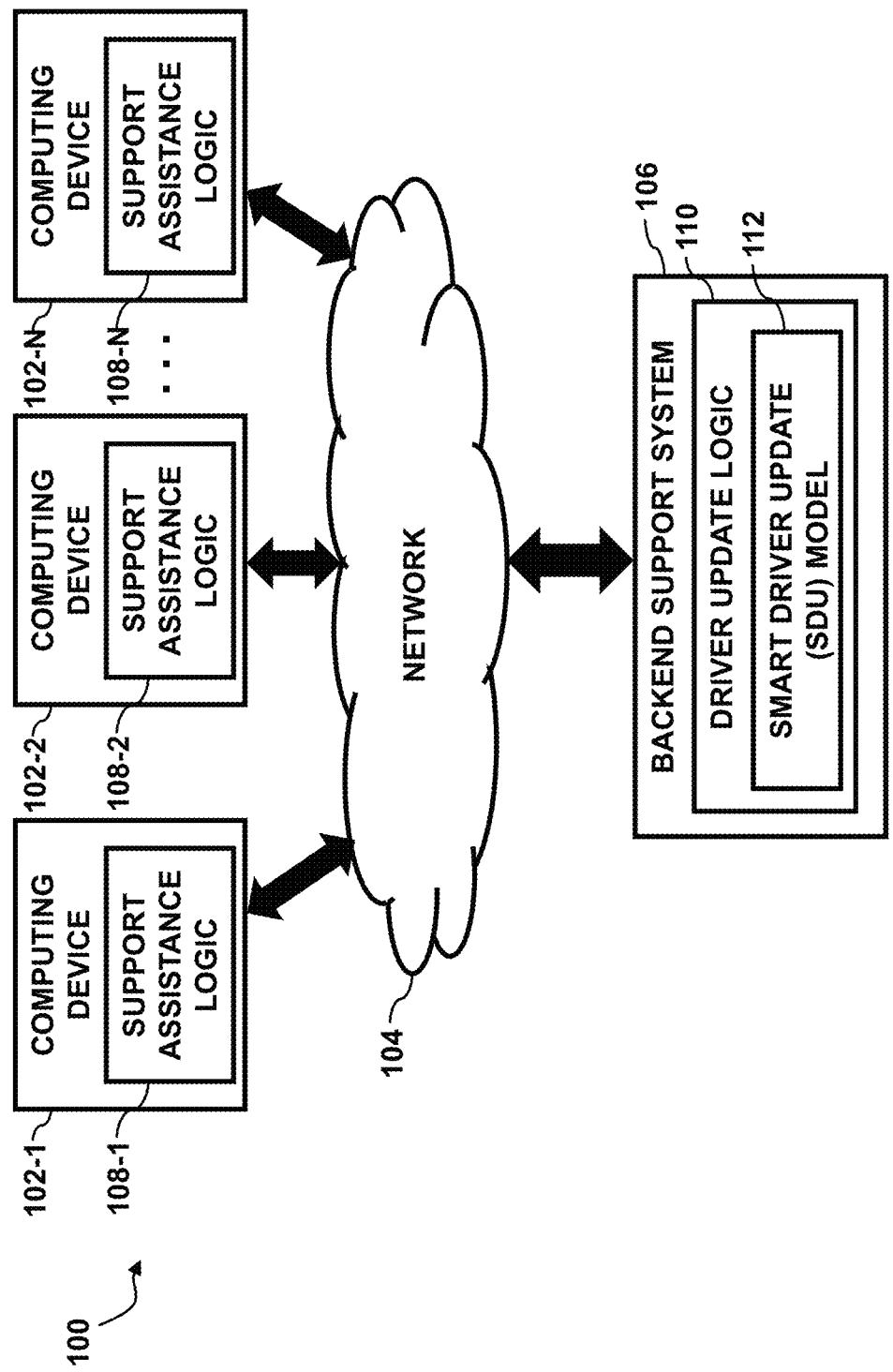
FIG. 1 is a block diagram of an example system comprising driver update functionality in an illustrative embodiment.

FIG. 1 shows a system 100 configured in accordance with an illustrative embodiment. The system 100 comprises computing devices 102-1, 102-2, . . . 102-N, also referred to herein collectively or individually as computing device 102. The computing devices 102 communicate over a network 104 with a backend support system 106.

The computing devices 102 and backend support system 106 illustratively comprise respective processing devices of one or more processing platforms. For example, the computing devices 102 and backend support system 106 can each comprise one or more processing devices each having a processor and a memory, possibly implementing virtual hosts such as, e.g., virtual machines, containers, virtual appliances, or other virtualization infrastructure, although numerous other configurations are possible.

In illustrative embodiments, the computing devices 102 comprise respective support assistance logic 108-1, 108-2 . . . 108-N, also referred to herein collectively or individually as support assistance logic 108, the function of which will be described in more detail below.

The term "user" herein is intended to be broadly construed so as to encompass numerous arrangements of human, hardware, software or firmware entities, as well as combinations of such entities.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The backend support system 106 comprises processing devices, memory, or other circuitry that may be utilized, for example, to provide technical support and assistance to the computing devices 102. While backend support system 106 may be described as comprising particular configurations herein, backend support system 106 is not limited to the disclosed embodiments and may comprise any other configuration of electrical and software components. In illustrative embodiments, backend support system 106 comprises driver update logic 110 the functionality of which will be described in more detail.

The computing devices 102 and backend support system 106 may be implemented on respective distinct processing platforms, although numerous other arrangements are possible. For example, in some embodiments at least portions of one or more of the computing devices 102 and backend support system 106 are implemented on the same processing platform. In some embodiments, backend support system 106 can be implemented at least in part within at least one processing platform that implements at least a portion of one or more of the computing devices 102. In some embodiments, the computing devices 102 can be implemented at least in part within at least one processing platform that implements at least a portion of backend support system 106.

The term "processing platform" as used herein is intended to be broadly construed so as to encompass, by way of illustration and without limitation, multiple sets of processing devices and associated computing systems that are configured to communicate over one or more networks.

Additional examples of processing platforms utilized to implement computing devices 102 or a backend support system 106 in illustrative embodiments will be described in more detail below in conjunction with FIGS. 12 and 13.

It is to be appreciated that these and other features of illustrative embodiments are presented by way of example only and should not be construed as limiting in any way.

Accordingly, different numbers, types and arrangements of system components such as computing devices 102, network 104 and backend support system 106 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Illustrative embodiments are not limited to arrangements in which the functionality described herein is implemented in a computing device or a backend support system, and therefore encompass various hybrid arrangements in which the functionality described herein is distributed over one or more computing devices and one or more backend support systems, each comprising one or more processing devices.

System failures are a common issue for computing devices. A system failure may comprise, for example, a crash, malfunction, system performance issue, or any other issue with a computing device that inhibits a user from continuing to utilize the computing device in an effective manner. When a system failure occurs, it interrupts a user's work and often leads to a loss of data if the active files are not saved in advance. In some cases, a system failure may occur due to incompatibility with a newly installed driver or an updated version of the driver, each of which may simply be referred to more generally herein as a driver or a driver installation. There are typically two main approaches that are utilized to guard user computing devices against driver-induced system failures, pre-certifying driver versions and banning driver versions based on user feedback about system failure experiences.

When pre-certifying a driver, an internal team associated with the backend support system 106 performs a variety of tests on the driver to ensure that the driver is not likely to cause a system failure. Often the tests are performed on a platform-by-platform basis where each platform comprises a particular device type having a particular software and hardware configuration. While many of the most recently deployed platforms are tested, older platforms often do not receive the same testing for the driver. Because of the limited scope of the testing being performed, system failure instances due to unexpected hardware-software incompatibilities may be triggered when older platforms install the same driver even where the more recently deployed platforms do not exhibit any issues with the driver.

In the second approach, drivers are banned from being recommended for installation based on feedback that is received by the backend support system 106 from the users of the computing devices. For example, users may contact technical support personnel associated with the backend support system 106 to report system failure issues that occur after the installation of a driver. Once the technical support personnel identify the drivers that receive multiple reports for a given platform, those drivers are banned or otherwise inhibited from being provided to user computing devices as an option for a driver installation. The user computing devices are therefore inhibited from installing the drivers that are known to have a high likelihood of causing a system failure for computing devices of that platform and experiencing system failures. However, banning drivers in this manner is a reactive instead of a proactive remediation which relies on a large number of the users of the computing devices to already experience and report the system failures and does not reach the full set of computing devices of that platform until a critical mass of those users have experienced the system failures.

In illustrative embodiments, the disclosed driver update logic 110 and support assistance logic 108 monitor not only driver behavior on new or recently deployed platforms but also driver behavior on older platforms and systematically track driver installations and potential system failures to determine the causality between those system failures and the driver installations in order to identify driver installations that are likely to cause a system failure. In addition, instead of reactively banning drivers based on user inputs received after system failures, driver update logic 110 and support assistance logic 108 proactively identify driver installations that are likely to cause a system failure and quarantine or remove those drivers from a recommended driver list once enough installations for each driver has been reached and the system failure probabilities are calculated and examined. The use of the disclosed driver update logic 110 and support assistance logic 108 significantly reduces the need for user-initiated technical support requests due to system failures while ensuring that drivers that are likely to cause a system failure are removed from circulation as soon as possible in an efficient manner that does not require user interaction.

Driver update logic 110 in conjunction with support assistance logic 108 is utilized to discover and inhibit the installation of drivers that are likely to trigger frequent system failures on particular platforms. The driver update logic 110 implements a smart driver update (SDU) model 112 that utilizes and is trained on information about driver installations and failure occurrences obtained from the support assistance logic 108 of the user computing devices 102. By integrating this SDU model 112 with the recommendation and deployment of drivers by the support assistance logic 108, the recommendation and deployment of driver updates that are likely to cause a system failure may be inhibited.

The SDU model 112 may be utilized for various platforms of computing devices 102 on which the support assistance logic 108 has been installed. As an example, each computing device 102 such as, e.g., a laptop, desktop, tablet, or other computing device, may comprise a particular platform and may a have a particular type, hardware configuration and software configuration. For example, a first laptop of a first platform may have a first type, a second laptop of the first platform may have a second type, a first desktop of a second platform may have a third type, a second desktop of a third platform may have a fourth type, and so on. In some cases, the platform may be defined by the type of the computing device 102 in conjunction with any hardware or software components that are included in the computing device 102. In some embodiments, the type of the computing device 102 may be defined based on the physical structure of the computing device 102, the line of business of the computing device 102, a brand of the computing device, or in any other manner. The platform may further indicate what components, hardware or software are included in a particular computing device 102 of a given type.

Figure 2:
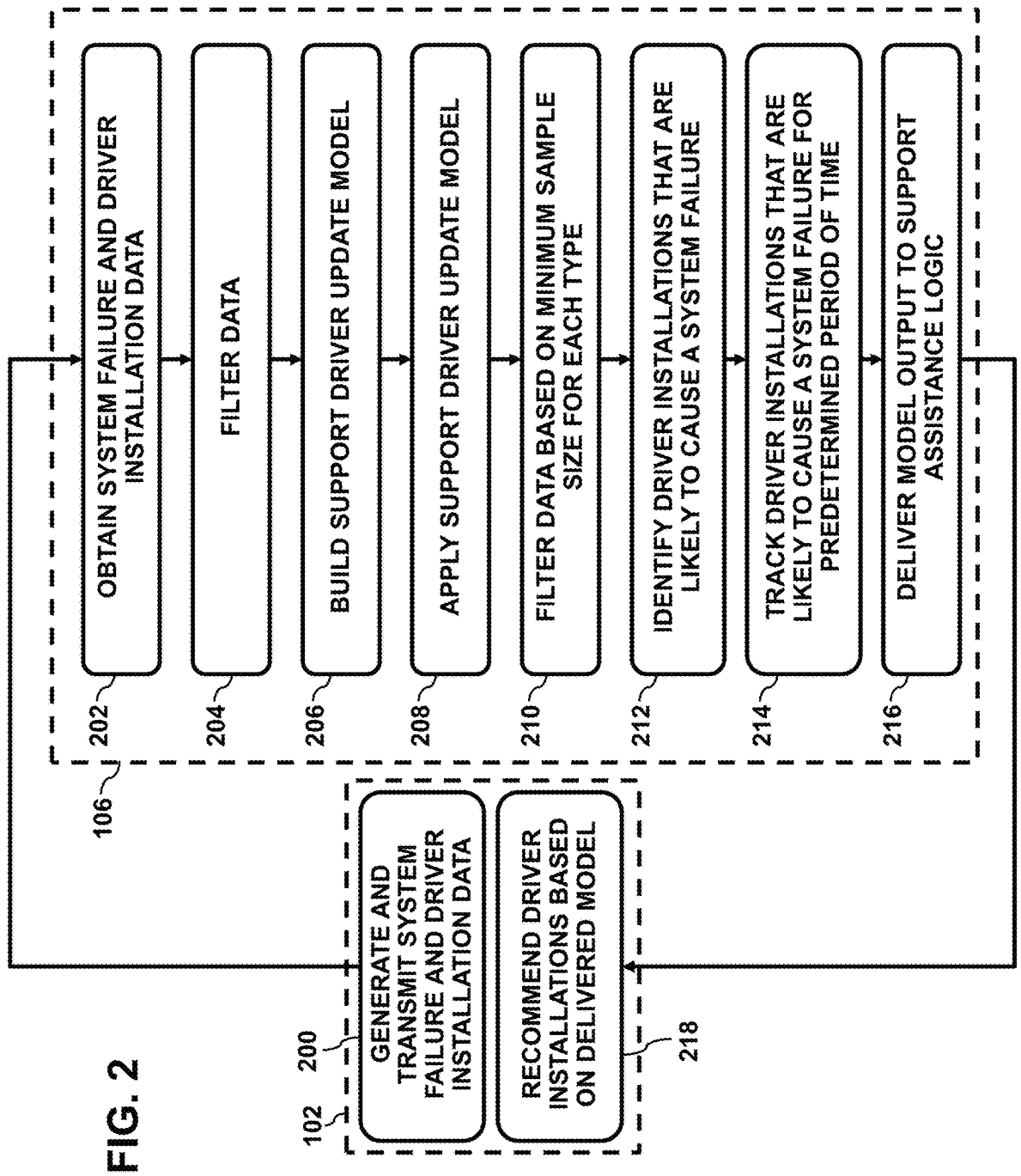
FIG. 2 is a flow diagram illustrating an example process in an illustrative embodiment.

FIG. 2 illustrates an example process for generating a SDU model 112 in some embodiments. The process as shown in FIG. 2 includes steps 200 through 218 and is suitable for use in the system 100 but is more generally applicable to other types of systems comprising multiple computing devices and a backend support system. The process is performed in part by one or more computing devices 102 and in part by backend support system 106. The process will be described with reference also to FIG. 1.

At step 200, the support assistance logic 108 installed on each of the computing devices 102 generates and transmits system failure and driver installation data for its respective computing device 102 to the backend support system 106. For example, support assistance logic 108 may monitor the activities of the computing device 102 and generate telemetry data about system failures. In addition, support assistance logic 108 may also monitor any driver installations on the computing device 102. In some cases, support assistance logic 108 may recommend and deploy driver installations on the computing device 102 and maintain information about any driver installations that have been deployed on the computing device 102. The transmission may comprise periodic submissions of the data to the backend support system 106, steaming of the data to the backend support system 106 or transmission of the data to the backend support system 106 in any other manner.

In some cases, the system failure information may comprise information about some or all of the failure instances that have happened on the computing device 102, a service tag or other identifier corresponding to the computing device 102, a platform identifier for the computing device 102, an operating system (OS) identifier for the computing device 102 that indicates a type and version of the OS running on the computing device 102, a timestamp of each failure occurrence or other information related to the failure.

In some cases, the information about the driver installation may comprise an indication of when and which driver versions have been installed by the support assistance logic 108 or in any other manner, a service tag or other identifier corresponding to the computing device 102, a platform identifier for the computing device 102 comprising, e.g., a product model or other platform identifier, a timestamp of the driver or basic input/output system (BIOS) installation event, e.g., based on the system clock of the computing device 102, an operating system (OS) identifier for the computing device 102 that indicates a type and version of the OS running on the computing device 102, an indication of the state or status of the driver or BIOS installation, e.g., "auto_install_success," "manual_install_failure", or other similar indications, an indication of a criticality of the driver installation, e.g., "Urgent," "Recommended" or any other indication, information identifying the driver or BIOS that was installed, information indicating a name of the driver or BIOS that was installed and information indicating a version of the driver or BIOS that was installed.

At step 202, the driver update logic 110 of the backend support system 106 obtains the transmitted system failure data and the corresponding driver installation data. In some embodiments, the system failure data and driver installation data may be stored on one or more storage devices of the backend support system 106 for later use in training or updating the SDU model 112. In some embodiments, the stored system failure data and driver installation data may be periodically updated with new system failure data and driver installation data automatically, e.g., hourly, daily, weekly, monthly, or according to any other time schedule. In some embodiments, the stored data may be updated on demand or in any other manner.

At step 204, the driver update logic 110 filters the obtained system failure data and driver installation data. For example, the data may be filtered based on a predetermined time frame such as, e.g., the last year, the last 6 months, the last 3 months, the last 30 days, the last 15 days, the last 5 days or any other timeframe. In some embodiments, other methods or criteria for filtering or parsing the failure and driver installation data may alternatively be utilized.

With reference to FIG. 3, an example table 300 is illustrated which shows information about the computing devices 102 that have been deployed to end users and are being monitored by the support assistance logic 108 in conjunction with the driver update logic 110 of the backend support system 106. As seen in FIG. 3, the information categorizes each computing device by its type and comprises an indication of the number of computing devices of each type that have been deployed, e.g., a computing device count, and an indication of a number of drivers installed on the computing devices 102 of each type, e.g., an installation count. The information may also comprise an indication of the ratio of the number of computing devices 102 of each type to a total number of computing devices 102, e.g., a computing device ratio, and an indication of the number of active service unit (ASU) computing devices, e.g., an ASU computing device count. ASU computing devices may comprise, for example, computing devices that are still active for services purposes, e.g., under warranty or have any other service agreement.

With reference to FIG. 4, an example table 400 is illustrated which shows information for a one-year period about system failures for the computing devices 102 that have been deployed to end users and are being monitored by the support assistance logic 108 in conjunction with the driver update logic 110 of the backend support system 106. As seen in FIG. 4, the information categorizes each computing device by its type and comprises an indication of the number of computing devices of each type that have been deployed, e.g., a computing device count, and an indication of a number of system failures experienced by the computing devices 102 of each type, e.g., failure instances. The information may also comprise an indication of the ratio of the number of computing devices 102 of each type to a total number of computing devices 102, e.g., a computing device ratio, and an indication of the number of ASU computing devices, e.g., an ASU computing device count.

At step 206, the driver update logic 110 builds the SDU model 112 based on the filtered failure and driver installation data for each platform and computing device type.

In some embodiments, the SDU model 112 may be built based on an assumption that if a system failure occurs within a predetermined period of time after the installation of a driver, then there is a causal relationship between the system failure event and the driver. In some embodiments, the predetermined period of time may be three hours. In other embodiments any other predetermined period of time may be utilized. The predetermined period of time may be set by a user, determined automatically by the driver update logic 110 or determined in any other manner.

In one example, the predetermined period of time may be determined based on the suggestions from one or more driver and system failure subject matter experts that are consulted for determining the predetermined period of time based on their experience. In some cases, system failure rates may be calculated for different driver installations, which could vary from 0% to above 10%. A system failure rate decision criterion may be developed for classifying what system failures rates are abnormal and unacceptably likely to cause a system failure with respect to a safe baseline average system failure rate. A number of different approaches may be utilized to determine the system failure rate criterion.

In a first example approach, the system failure rate criterion may be determined by applying statistical outliers and calculating the cutoff threshold as the sum between the third quartile system failure rate and 1.5 times the interquartile range. For example, if the third quartile is 1.17% and the interquartile range 0.81%, the cutoff is calculated to be about 2.39%.

In a second example approach, the system failure rate criterion may be determined by applying the 2-Sigma method. As part of the 2-Sigma method the cutoff may be calculated as the sum between the mean of the data plus two times the data's standard deviation. For example, if the mean is 1% and the standard deviation is 1.55%, the cutoff is calculated as about 4.1%.

In a third example approach, the system failure rate criterion may be determined by the machine learning algorithm Isolation Forest which is a tree-based anomaly detection algorithm. For example, the Isolation Forest may be utilized to determine an example anomaly cutoff of about 2.3% as shown, for example, in the chart 500 of FIG. 5 which shows a plot of the failure rate against an anomaly score calculated by the Isolation Forest algorithm.

Any of these example approaches for determining the system failure rate criterion may be utilized individual or collectively. For example, in some embodiments, the cutoff output by only one of these approaches may be utilized, e.g., 2.4%, 4.1% or 2.3% in the above examples. In other embodiments more than one of the approaches for determining the system failure rate criterion may be utilized together, e.g., by determining an average, median, mean, or any other value based on the outputs of these example approaches. For example, in some embodiments, a middle-of-the-road cutoff value of about 3% may be utilized. In some embodiments, the calculated cutoff value may also be validated by consulting with one or more subject matter experts. While three approaches are provided above as examples, any other approaches may alternatively be utilized to determine a system failure rate criterion.

In some embodiments, driver update logic 110 may take into account a type of driver installation. For example, in some cases a driver installation may be classified as a security-related driver installation, a recommended driver installation, a critical driver installation or any other type of driver installation. In order to ensure that security related driver installations are not unintentionally inhibited from installation by the driver update logic 110, in some embodiments, driver update logic 110 may obtain driver installation type information, e.g., from the source of the driver, from a third-party database, or in any other manner. In the case that the driver installation type information indicates that the driver is a security related driver or any other type for which installation should not be inhibited, driver update logic 110 may remove that driver from consideration for analysis using the SDU model 112. In some embodiments, for example, the type information about a driver may be parsed using natural language processing tools to identify security related language that may be utilized to determine whether or not the driver needs to be removed from consideration.

The SDU model 112 may be updated or rebuilt periodically or on demand as needed. In some embodiments, for example, the SDU model 112 may be updated or rebuilt based on the data obtained from the support assistance logic 108 on an hourly basis, daily basis, weekly basis, monthly basis, or any other period of time.

At step 208, the built SDU model 112 is applied to the drivers that have not been removed from consideration, e.g., due to a type of the driver installation as described above.

At step 210, the drivers may be filtered based on a minimal sample size for each device type. When determining the system failure rates for each device type it may be important in some cases to consider additional information. For example, if the driver was recently released, it may be beneficial or important for the driver update logic 110 to wait until information for a sufficient sample size of installations has been generated before considering the driver's failure rate for that device type as being representative of the true underlying population of failure rates for that device type for that driver.

For example, each driver installation on a given computing device 102 has a binary number of possible outcomes within the predetermined time window subsequent to the driver installation, e.g., a 3-hour window. Either the driver installation causes a system failure at a hypothesized probability p or does not cause a system failure at a probability 1-p. Assuming that n driver installations, e.g., each on a unique computing device, are independent and identically distributed events and k of these installations trigger system failures in the subsequent time window, X, the installation of a given driver, and K, the collection of these installations on a given device type, may be defined according to equations (1)-(5) as follows:

$$X \sim \text{Bernoulli}(p) \quad (1)$$

$$K \sim \text{Binomial}(n,p) \quad (2)$$

Where:

$$Pr(X=\text{failure})=p \quad (3)$$

$$Pr(X=\text{not failure})=1-p \quad (4)$$

And:

$$Pr(K=k) = \frac{n!}{k!\,(n-k)!} p^k [(1-p)]^{(n-k)} \quad (5)$$

Assuming that the data follows the probability distributions of the discrete random variables above, binomial proportions hypothesis testing can be applied to test if a given driver installation's sample failure rate is statistically significant. The null hypothesis is that the sampling failure rate, calculated as the proportions of failure-causing driver installations among all driver installations in a sample, e.g., a collection of user installations within a predefined size, is not statistically significantly different from the population failure rate, e.g., the average failure rate among all drivers installed on a given platform. In order to determine whether or not the sample failure rate abnormally exceeds the baseline rate in a statistical manner, a superiority test may be utilized. For example, the paradigm of frequentist statistical hypothesis testing may be according to equations (6) and (7) as follows:

$$H0: p0=p1 \quad (6)$$

$$H1: p0<p1 \quad (7)$$

For the calculation of sample sizes, two statistical values may be determined for the tests, alpha and statistical power. Alpha refers to a given test's statistical significance level and the probability of a false positive for the given test. Statistical power refers to the probability that the test will reject the null hypothesis when the null hypothesis should be rejected. Various combinations of alpha, statistical power, hypothesized population failure rates, and sample failure rates may be utilized to calculated different sample sizes.

The different sample sizes may be analyzed using historical data. For example, empirical failure rates may change with respect to increasing installations of a particular driver on a particular platform. As the installation count increases, the failure rates may fluctuate and eventually decrease and stabilize toward a certain baseline. In one example, the failure rate corresponding to a pre-calculated sample size of 190 may be approximately 2% which is smaller than the example 3% failure rate cutoff criterion described above. This means that for this particular driver, waiting for 190 driver installations and calculating the corresponding failure rate would result in a determination that this driver is not likely enough to cause a system failure to be banned from recommendation and installation. However, had a smaller samples size been utilized, such as, e.g., less than 100, the failure rate may have been higher than 3% and the driver would have been identified as being a driver that is unacceptably likely to cause a system failure. In such a situation, the driver would be banned due to a false positive result because the sample size was not sufficiently large. This example, illustrates why the sample size of driver installations may be an important factor when estimating failure rates.

Figures 5, 6:
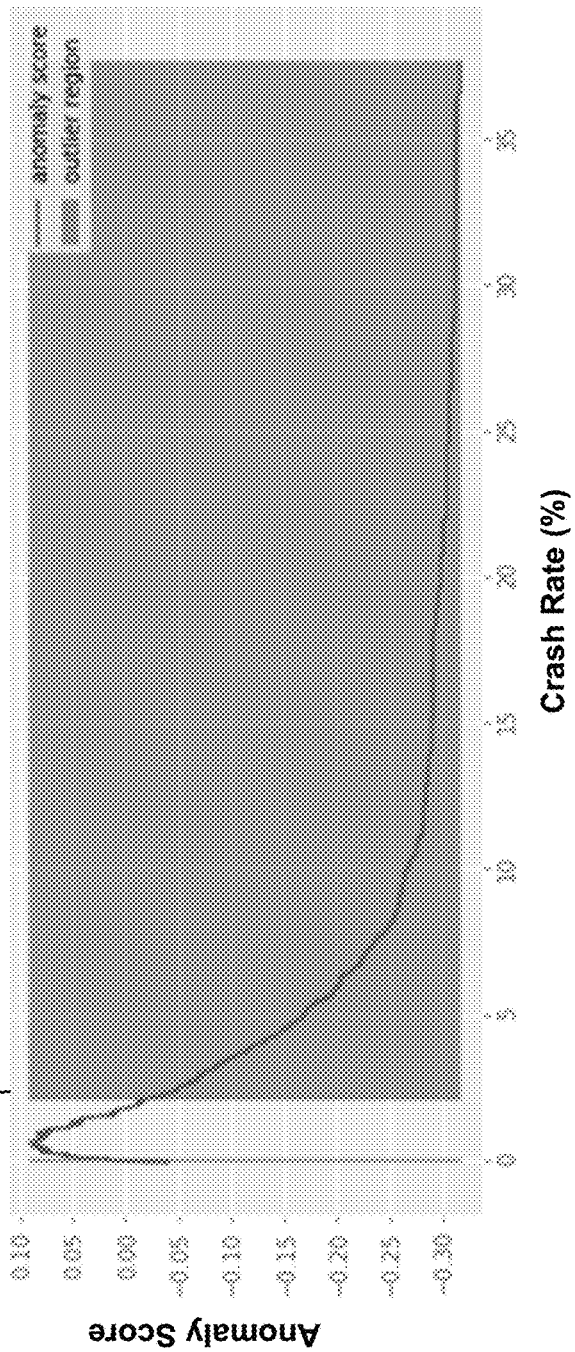
FIG. 5 is a chart illustrating an example output of an Isolation Forest machine learning algorithm in an illustrative embodiment.
FIG. 6 illustrates a table comprising example information about statistical power and average sample sizes in an illustrative embodiment.

Of the various sample sizes calculated under different assumptions regarding alpha, statistical power and population failure rates among different drivers, the optimal sample sizes would be those that are small enough to be able to be filled within a reasonable amount of time yet not so small as to result in frequent premature false positives. Example table 600 of FIG. 6 shows an example scenario of a testing of different sample sizes on historical failure rates. The example table 600 illustrates how many drivers on different platforms would be banned under the 3% failure rate cut-off criterion if such a decision were made based on the sample failure rate calculated around the sample sizes listed the top of each column.

For example, as seen in the example table 600 of FIG. 6, at a statistical power of 80%, and an average sample size of 100, 20 driver installations for a platform are banned in a 1-year period and 40 driver installations for a platform are banned in a 3-year period. At a statistical power of 85%, and an average sample size of 120, 15 driver installations for a platform are banned in a 1-year period and 25 driver installations for a platform are banned in a 3-year period. At a statistical power of 90%, and an average sample size of 180, 8 driver installations for a platform are banned in a 1-year period and 15 driver installations for a platform are banned in a 3-year period. At a statistical power of 95%, and an average sample size of 230, 5 driver installations for a platform are banned in a 1-year period and 8 driver installations for a platform are banned in a 3-year period. At a statistical power of greater than 95%, and an average sample size of 450, 4 driver installations for a platform are banned in a 1-year period and 6 driver installations for a platform are banned in a 3-year period. At a statistical power of significantly greater than 95%, and an average sample size of 1250, 4 driver installations for a platform are banned in a 1-year period and 5 driver installations for a platform are banned in a 3-year period.

As seen in table 600, smaller sample sizes such as around 100, 120, and 180 generally exhibit a higher rate of identifying more drivers as unacceptably likely to cause a system failure. As the sample size increases, however, many of these identifications would instead turn out to be false positives. In general, a sample size average of around 230 in this example across all platforms produces the smallest amount of false positive identifications. As seen in table 600, as the sample size continues to increase, there is no significant improvement in reducing the amount of false positives that occur.

While 230 is provided as an example average of different sample sizes used for different device types, because the same driver installation on different device types behaves differently, and the less stable device types may need a larger sample size to maintain a certain statistical power. For example, as shown in FIG. 7, an example table 700 shows a breakdown of sample sizes based on device type at a statistical power of 95.

As seen in FIG. 7, for example, at statistical power 95, computing devices 102 of type 1 may need a sample size of 305, computing devices 102 of type 2 may need a sample size of 210, computing devices 102 of type 3 may need a sample size of 190, computing devices 102 of type 4 may need a sample size of 195, computing devices 102 of type 5 may need a sample size of 165, computing devices 102 of type 6 may need a sample size of 245, computing devices 102 of type 7 may need a sample size of 200 and computing devices 102 of type 8 may need a sample size of 330.

With reference now to FIG. 8, the driver update logic 110 may need to determine how long to wait in order to finish collecting the information for the sample sizes. For example, sampling periods may be calculated and ranked based on historical driver installation behaviors. As seen in the example table 800 of FIG. 8, for the average sample size at each power, the period of time needed to achieve the average sample size is shown based on the installation size, e.g., the number of days to reach the sample size, and the installation rate, e.g., the number of installations per day, may be calculated based on historical driver installation data. As an example, at a statistical power of 95 and an average sample size of 230, 50% of the drivers have reached the sample size in 15 days, 75% in 55 days and 95% in 230 days. In addition, in this example, the 95th percentile driver installation rate to reach the average sample size of 230 was 165 installs a day, the $75^{th}$ percentile driver installation rate to reach the average sample size of 230 was 40, and so on.

At step 212, after a sufficient sample size for a given device type has been obtained, driver update logic 110 identifies the driver as a potentially likely to cause a system failure if the failure rate is greater than the determined %, e.g., 3% as mentioned in the above example.

At step 214, after an analysis of failure rates has been performed by the driver update logic 110 and any driver installations that are likely to cause a system failure have been identified after reaching the target sample size for that computing device type, in some embodiments, the driver update logic 110 may continue tracking and observing the driver installations that are likely to cause a system failure for a predetermined period of time, e.g., a week, to determine whether or not the associated failure rate stabilizes or oscillates relative to the cutoff.

At step 216, after the predetermined period of time, the output of the SDU model 112 for those drivers having a failure rate that is steadily above the cutoff may be integrated and deployed to the support assistance logic of the computing device 102. For example, driver update logic 110 may bundle the SDU model 112 with the latest support assistance logic 108 for deployment to the computing devices 102. The support assistance logic 108 may obtain the bundled SDU model 112, e.g., periodically, on demand or in any other manner, and update its own SDU model 112 with the latest information on drivers that are likely to cause a system failure.

At step 218, support assistance logic 108 generates a graphical user interface (GUI) in which driver installations are recommended to a user of the computing device 102 based on the integrated SDU model 112. In illustrative embodiments, the drivers that have been identified as being likely to cause a system failure for computing devices of the same device type or platform as the computing device 102 are inhibited from being presented to and recommended to the user of the computing device 102 based on the SDU model 112.

For example, whenever support assistance logic 108 performs a driver scan, it acquires a list of driver recommendations, e.g., a list previously received or received on-demand from the backend support system 106 or a list received from a third-party source. Support assistance logic 108 loads the latest SDU model 112 into the memory of the computing device and obtains the failure rate information for each recommended driver, e.g., based on the platform, OS, device type, driver identifier, or other relevant information. If the failure rate for a driver is greater than the cutoff for that computing device 102, support assistance logic 108 sets an indication, e.g., a flag, which indicates that the driver should be inhibited from being presented as a recommendation. When generating the GUI, support assistance logic 108 may then filter out any driver installations that have a corresponding indication set.

For example, with reference now to FIGS. 9 and 10, example GUIs that may be presented by a computing device 102 to a user are illustrated. The GUI 900 of FIG. 9 shows an example of driver recommendations that are presented to a user when the SDU model 112 is not utilized to filter out drivers that are likely to cause a system failure. As can be seen in GUI 900, updates 4 through 8 are recommended for installation.

The GUI 1000 of FIG. 10 shows an example of driver recommendations that are presented to a user when the SDU model 112 is utilized to filter out drivers that are likely to cause a system failure. For example, utilizing SDU model 112, driver update logic 110 may determine that update 4 has a failure rate above the cutoff for the device type of the computing device 102 after a sufficient sample size has been collected for the that device type, e.g., in the manner described above. Driver update logic 110 may therefore flag update 4 as a driver installation that is likely to cause a system failure when integrating the SDU model 112 for use by the support assistance logic 108 on the computing device 102.

Support assistance logic 108 may inhibit update 4 from being presented to the user of the computing device 102 based on the integrated SDU model 112. For example, as can be seen in GUI 1000, update 4 is inhibited from being recommended to the user of the computing device due to being flagged as a driver installation that is likely to cause a system failure and therefore is no longer presented as an option in the GUI 1000 in the recommended updates category.

It is to be understood that for any methodologies described herein with reference to the flow diagram of FIG. 2, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for different storage systems.

The driver update logic 110 of the backend support system 106 in conjunction with the support assistance logic 108 installed on the computing devices 102 provides the functionality to determine causality between driver updates and failure instances. For example, since the support assistance logic 108 collects extensive telemetry data, including when and which drivers were installed and whether or not system failures happened within a certain time frame after installation, the potential causality between driver installation and system failures may be determined which may allow the driver update logic 110 of the backend support system 106 to predict potential system failure scenarios due to the drivers.

The driver update logic 110 of the backend support system 106 in conjunction with the support assistance logic 108 installed on the computing devices 102 also provides an early warning predictive model to personalize driver recommendations to users of computing devices in a manner that proactively prevents system failures for the particular platforms and device types that are likely to have a system failure due to the driver installations.

For example, instead of recommending all of the latest driver updates to the users, the SDU model 112 instead is leveraged to determine an optimal set of recommended driver updates based on the platform, device type or other configuration of the user's computing device 102. The support assistance logic 108 may then recommend driver installations with relatively low chances of causing a system failure for that computing device 102. In addition, once driver installations that are likely to cause a system failure have been identified by the SDU model 112, these driver installations will no longer be presented to the user as an option, thus preventing the user from experiencing associated system failures.

By leveraging a variety of techniques to determine the cutoff for when a driver installation may be determined to be likely to cause a system failure, a more robust cutoff point for when a driver installation may be considered abnormally or unacceptably likely to cause a system failure may be determined. Such techniques may include, for example, statistical outlier detection techniques, the 2-sigma method and machine learning-based techniques such as Isolation Forest. Any other techniques may also or alternatively be utilized to determine the cutoff.

In one example scenario according to the above embodiments, the SDU model 112 may determine and output a system failure table 1100 on a weekly basis, for example, as shown in FIG. 11. Table 1100 contains system failure rates for various combined configurations of OS, device type, platform and driver ID. In this example scenario, the system failure rate is determined as computing devices of each configuration experience system failures after a driver installation, referred to as failed assets in table 1100, divided by how many computing devices have installed the same driver, referred to as installed assets in table 1100.

As seen in table 1100, even for the same driver, failure rates can vary significantly across differently different platforms. For example, driver AHG23 is installed on both computing devices 102 having platform 1 and computing devices 102 having platform 2. In particular, driver AHG23 was installed on 53,500 computing devices 102 having platform 1 and experienced 1800 system failures, resulting in a failure rate of about 3.36%. Driver AHG23 was also installed on 20,320 computing devices 102 having platform 2 and experienced 190 system failures, resulting in a failure rate of about 0.94%. As can be seen by these numbers, the installation of driver AHG23 on computing devices 102 having platform 1 experienced significantly higher failure rates than the installation of driver AHG23 on computing devices 102 having platform 2.

In the example scenario, an assumption may be made that the installations of driver AHG23 on both the computing devices 102 having platform 1 and the computing devices 102 having platform 2 have reached the target sample size as determined in the manner described above. In addition, an assumption may be made that the cutoff is 3%, as determined in the manner described above.

The failure rate of 3.36% for the computing devices 102 having platform 1 is therefore above the cutoff of 3% in the example scenario, resulting in the support assistance logic 108 inhibiting the presentation of driver AHG23 from recommendation to the users of the computing devices 102 having platform 1 going forward.

In contrast, the failure rate of 0.94% for the computing devices 102 having platform 1 is below the cutoff of 3% in the example scenario, resulting in the support assistance logic 108 allowing the presentation of driver AHG23 as a recommendation to the users of the computing devices 102 having platform 2 going forward.

While described with reference to a difference in platform, any other configuration differences in the computing devices 102 may causes different failure rates including, e.g., OS, device type or any other differences.

As can be seen in the example scenario described above, the support assistance logic 108 and SDU model 112 provide functionality that is personalized to each computing device 102 on a platform, device type, OS or other configuration basis.

Functionality such as that described herein can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a computing device such as computing device 102 and a backend support system such as backend support system 106 that is configured to control performance of one or more steps described herein can be implemented as part of what is more generally referred to herein as a processing platform comprising one or more processing devices each comprising a processor coupled to a memory. In the case of a computing device or backend support system, a given such processing device may correspond to one or more virtual machines or other types of virtualization infrastructure such as Docker containers or Linux containers (LXCs). The computing device 102 or backend support system 106, as well as other system components, may be implemented at least in part using processing devices of such processing platforms. For example, in a distributed implementation of the backend support system 106, respective distributed modules of such a backend support system can be implemented in respective containers running on respective ones of the processing devices of a processing platform.

It is to be appreciated that the particular advantages described above and elsewhere herein are associated with particular illustrative embodiments and need not be present in other embodiments. Also, the particular types of system features and functionality as illustrated in the drawings and described above are exemplary only, and numerous other arrangements may be used in other embodiments.

Illustrative embodiments of processing platforms utilized to implement computing devices or backend support systems with the above-described functionality will now be described in greater detail with reference to FIGS. 12 and 13. Although described in the context of system 100, these platforms may also be used to implement at least portions of other information processing systems in other embodiments.

Figure 12:
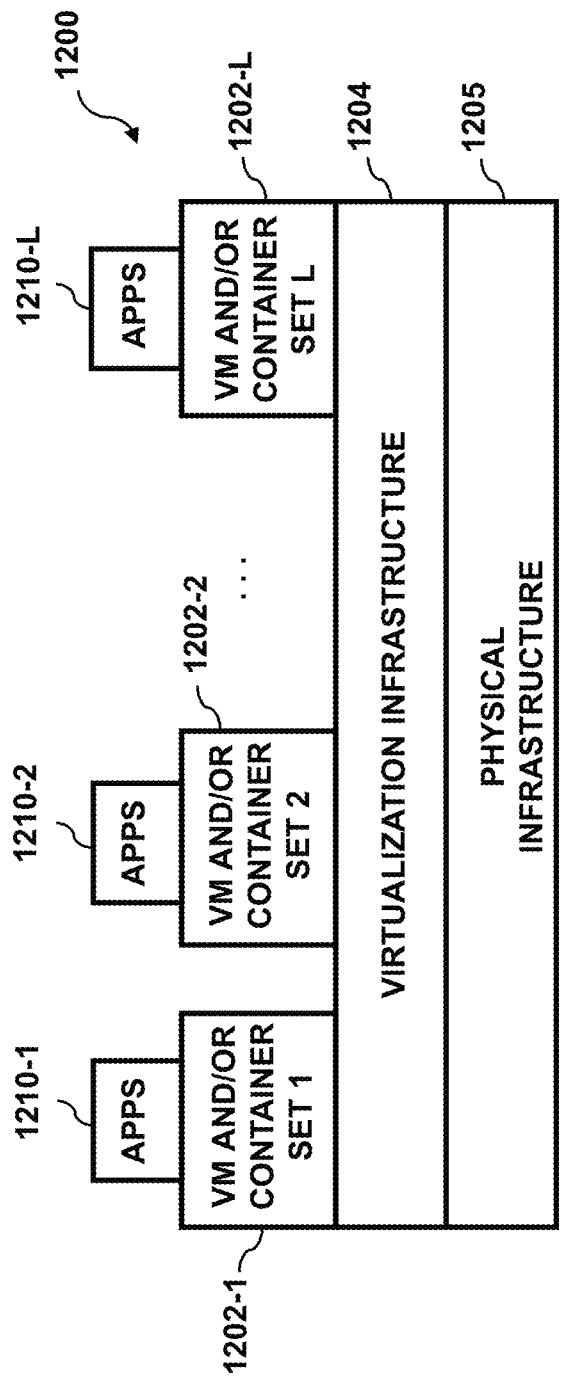
FIGS. 12 and 13 show examples of processing platforms that may be utilized to implement at least a portion of an information processing system in an illustrative embodiment.
Figure 13:
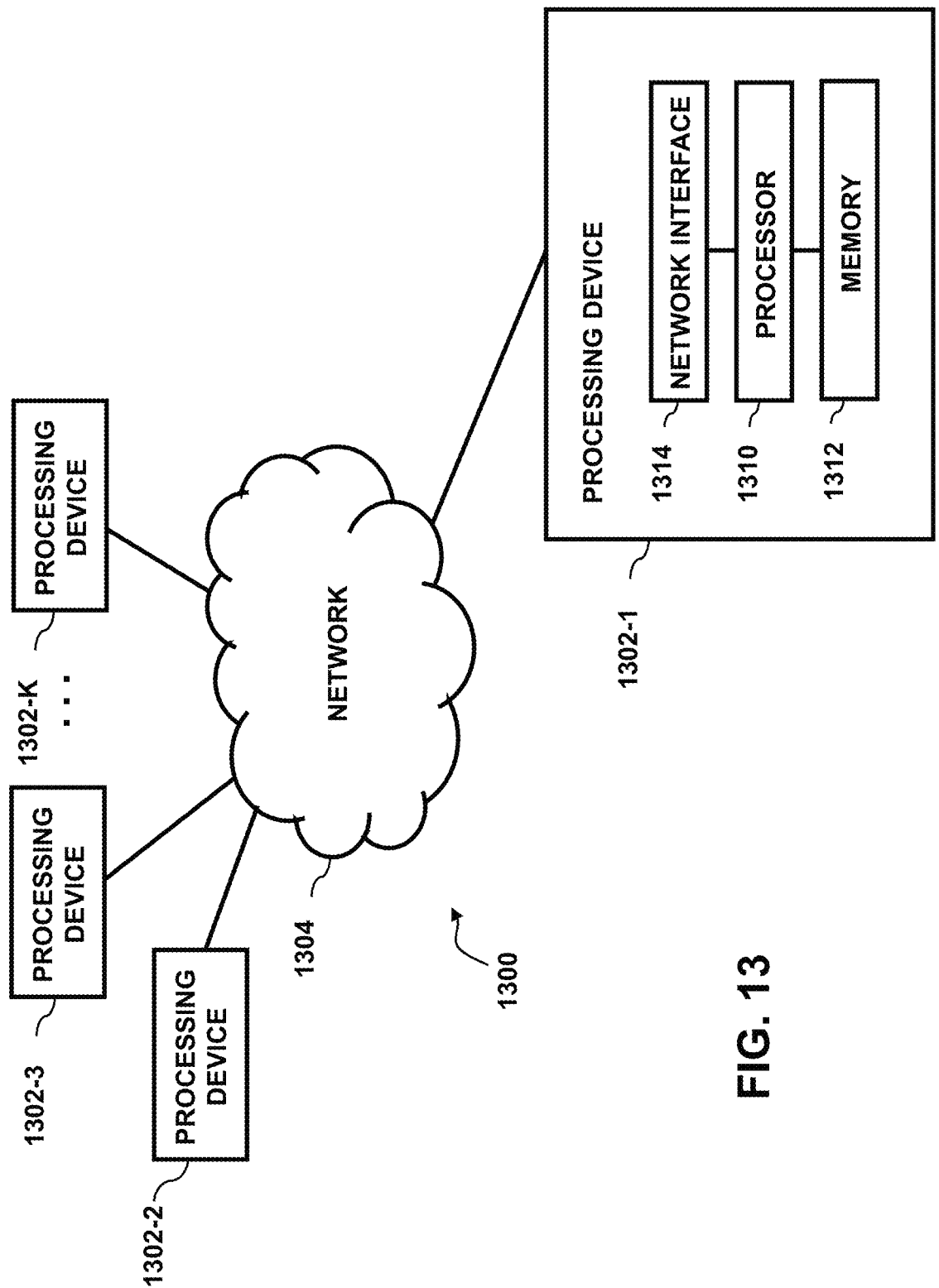

FIG. 12 shows an example processing platform comprising cloud infrastructure 1200. The cloud infrastructure 1200 comprises a combination of physical and virtual processing resources that may be utilized to implement at least a portion of the system 100. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, ... 1210-L running on respective ones of the VMs/container sets 1202-1, 1202-2, ... 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. Such implementations can provide functionality of the type described above in the illustrative embodiments for one or more processes running on a given one of the VMs. For example, each of the VMs can implement the above-described functionality of the illustrative embodiments in the system 100.

A hypervisor platform that implements a hypervisor within the virtualization infrastructure 1204 may comprise an associated virtual infrastructure management system. The underlying physical machines may comprise one or more distributed processing platforms.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system. Such implementations can also provide functionality of the type described above in the illustrative embodiments. For example, a container computing device supporting multiple containers of one or more container sets can implement one or more cores executing the above-described functionality of the illustrative embodiments.

As is apparent from the above, one or more of the processing modules or other components of system 100 may each run on a computer, server or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, ... 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312.

The processor 1310 may comprise a microprocessor, a microcontroller, an application-specific integrated circuit (ASIC), a field-programmable gate array (FPGA) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of a system as disclosed herein can be implemented at least in part in the form of one or more software programs stored in memory and executed by a processor of a processing device. For example, at least portions of the functionality of one or more components of a system as disclosed above in the illustrative embodiments are illustratively implemented in the form of software running on one or more processing devices.

It should again be emphasized that the above-described embodiments are presented for purposes of illustration only. Many variations and other alternative embodiments may be used. For example, the disclosed techniques and functionality described above in the illustrative embodiments are applicable to a wide variety of other types of systems, computing devices, backend support systems or other systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising at least one processing device comprising a processor coupled to memory, the at least one processing device being configured:

to obtain information about driver installations of a given driver on a plurality of computing devices from the plurality of computing devices;
to obtain information about system failures from the plurality of computing devices;
to determine a correlation between the driver installations of the given driver on the plurality of computing devices and the system failures;
to determine that the given driver is likely to cause at least one of the system failures based at least in part on the determined correlation between the driver installations of the given driver on the plurality of computing devices and the system failures; and
to provide an indication that the given driver is likely to cause at least one of the system failures to a given computing device, the indication being configured to cause the given computing device to inhibit a presentation of a recommendation to install the given driver to a user of the given computing device;
wherein the at least one processing device is further configured to determine a failure rate cutoff value; and
determining that the given driver is likely to cause at least one of the system failures based at least in part on the determined correlation between the driver installations of the given driver on the plurality of computing devices and the system failures comprises determining that a rate of the system failures is greater than the failure rate cutoff value.

2. The apparatus of claim 1 wherein determining the correlation between the driver installations of the given driver on the plurality of computing devices and the system failures comprises filtering the information about the system failures to a pre-determined amount of time subsequent to the driver installations of the given driver on each of the plurality of computing devices.

3. The apparatus of claim 1 wherein:
a first sub-set of the plurality of computing devices comprises a first configuration type and a second sub-set of the plurality of computing devices comprises a second configuration type that is different than the first configuration type; and
determining the correlation between the driver installations of the given driver on the plurality of computing devices and the system failures comprises determining a correlation between the driver installations of the given driver on computing devices having the first configuration type and the system failures for computing devices having the first configuration type based at least in part on the driver installations of the given driver on the first sub-set of the plurality of computing devices and system failures of the first sub-set of the plurality of computing devices.

4. The apparatus of claim 3 wherein the given computing device is different than the plurality of computing devices and comprises the first configuration type.

5. The apparatus of claim 1 wherein:
the at least one processing device is further configured:
to determine a minimum sample size of the driver installations of the given driver on the plurality of computing devices; and
to determine that the minimum sample size has been met based at least in part on the obtained information about the driver installations of the given driver on the plurality of computing devices; and
determining the correlation comprises determining the correlation based at least in part on the determination that the minimum sample size has been met.

6. The apparatus of claim 1 wherein:
the at least one processing device is further configured:
to wait a predetermined period of time between determining that the given driver is likely to cause at least one of the system failures and providing the indication that the given driver is likely to cause at least one of the system failures to the given computing device; and
based at least in part on an expiration of the predetermined period of time, to determine that the given driver is still likely to cause at least one of the system failures; and
providing the indication that the given driver is likely to cause at least one of the system failures to the given computing device comprises providing the indication that the given driver is likely to cause at least one of the system failures to the given computing device based at least in part on the determination that the given driver is still likely to cause at least one of the system failures.

7. The apparatus of claim 1 wherein the failure rate cutoff value is determined at least in part utilizing a machine learning technique.

8. A method comprising:
obtaining information about driver installations of a given driver on a plurality of computing devices from the plurality of computing devices;
obtaining information about system failures from the plurality of computing devices;
determining a correlation between the driver installations of the given driver on the plurality of computing devices and the system failures;
determining that the given driver is likely to cause at least one of the system failures based at least in part on the determined correlation between the driver installations of the given driver on the plurality of computing devices and the system failures; and
providing an indication that the given driver is likely to cause at least one of the system failures to a given computing device, the indication being configured to cause the given computing device to inhibit a presentation of a recommendation to install the given driver to a user of the given computing device;
wherein the method further comprises determining a failure rate cutoff value; and
determining that the given driver is likely to cause at least one of the system failures based at least in part on the determined correlation between the driver installations of the given driver on the plurality of computing devices and the system failures comprises determining that a rate of the system failures is greater than the failure rate cutoff value;
wherein the method is implemented by at least one processing device comprising a processor coupled to memory.

9. The method of claim 8 wherein determining the correlation between the driver installations of the given driver on the plurality of computing devices and the system failures comprises filtering the information about the system failures to a pre-determined amount of time subsequent to the driver installations of the given driver on each of the plurality of computing devices.

10. The method of claim 8 wherein:
a first sub-set of the plurality of computing devices comprises a first configuration type and a second sub-set of the plurality of computing devices comprises a second configuration type that is different than the first configuration type; and determining the correlation between the driver installations of the given driver on the plurality of computing devices and the system failures comprises determining a correlation between the driver installations of the given driver on computing devices having the first configuration type and the system failures for computing devices having the first configuration type based at least in part on the driver installations of the given driver on the first sub-set of the plurality of computing devices and system failures of the first sub-set of the plurality of computing devices.

11. The method of claim 10 wherein the given computing device is different than the plurality of computing devices and comprises the first configuration type.

12. The method of claim 8 wherein:
the method further comprises:
    determining a minimum sample size of the driver installations of the given driver on the plurality of computing devices; and
    determining that the minimum sample size has been met based at least in part on the obtained information about the driver installations of the given driver on the plurality of computing devices; and
determining the correlation comprises determining the correlation based at least in part on the determination that the minimum sample size has been met.

13. The method of claim 8 wherein:
the method further comprises:
    waiting a predetermined period of time between determining that the given driver is likely to cause at least one of the system failures and providing the indication that the given driver is likely to cause at least one of the system failures to the given computing device; and
    based at least in part on an expiration of the predetermined period of time, determining that the given driver is still likely to cause at least one of the system failures; and
providing the indication that the given driver is likely to cause at least one of the system failures to the given computing device comprises providing the indication that the given driver is likely to cause at least one of the system failures to the given computing device based at least in part on the determination that the given driver is still likely to cause at least one of the system failures.

14. The method of claim 8 wherein the failure rate cutoff value is determined at least in part utilizing a machine learning technique.

15. A computer program product comprising a non-transitory processor-readable storage medium having stored therein program code of one or more software programs, wherein the program code when executed by at least one processing device, the at least one processing device comprising a processor coupled to memory, causes the at least one processing device:
    to obtain information about driver installations of a given driver on a plurality of computing devices from the plurality of computing devices;
    to obtain information about system failures from the plurality of computing devices;
    to determine a correlation between the driver installations of the given driver on the plurality of computing devices and the system failures;
    to determine that the given driver is likely to cause at least one of the system failures based at least in part on the determined correlation between the driver installations of the given driver on the plurality of computing devices and the system failures; and
    to provide an indication that the given driver is likely to cause at least one of the system failures to a given computing device, the indication being configured to cause the given computing device to inhibit a presentation of a recommendation to install the given driver to a user of the given computing device;
wherein the program code when executed further causes the at least one processing device to determine a failure rate cutoff value; and
determining that the given driver is likely to cause at least one of the system failures based at least in part on the determined correlation between the driver installations of the given driver on the plurality of computing devices and the system failures comprises determining that a rate of the system failures is greater than the failure rate cutoff value.

16. The computer program product of claim 15 wherein determining the correlation between the driver installations of the given driver on the plurality of computing devices and the system failures comprises filtering the information about the system failures to a pre-determined amount of time subsequent to the driver installations of the given driver on each of the plurality of computing devices.

17. The computer program product of claim 15 wherein:
    a first sub-set of the plurality of computing devices comprises a first configuration type and a second sub-set of the plurality of computing devices comprises a second configuration type that is different than the first configuration type;
    determining the correlation between the driver installations of the given driver on the plurality of computing devices and the system failures comprises determining a correlation between the driver installations of the given driver on computing devices having the first configuration type and the system failures for computing devices having the first configuration type based at least in part on the driver installations of the given driver on the first sub-set of the plurality of computing devices and system failures of the first sub-set of the plurality of computing devices; and
    the given computing device is different than the plurality of computing devices and comprises the first configuration type.

18. The computer program product of claim 15 wherein:
the program code further causes the at least one processing device:
    to determine a minimum sample size of the driver installations of the given driver on the plurality of computing devices; and
    to determine that the minimum sample size has been met based at least in part on the obtained information about the driver installations of the given driver on the plurality of computing devices; and
determining the correlation comprises determining the correlation based at least in part on the determination that the minimum sample size has been met.

19. The computer program product of claim 15 wherein:
the program code further causes the at least one processing device:
    to wait a predetermined period of time between determining that the given driver is likely to cause at least one of the system failures and providing the indication that the given driver is likely to cause at least one of the system failures to the given computing device; and based at least in part on an expiration of the predetermined period of time, to determine that the given driver is still likely to cause at least one of the system failures; and providing the indication that the given driver is likely to cause at least one of the system failures to the given computing device comprises providing the indication that the given driver is likely to cause at least one of the system failures to the given computing device based at least in part on the determination that the given driver is still likely to cause at least one of the system failures.

20. The computer program product of claim 15 wherein the failure rate cutoff value is determined at least in part utilizing a machine learning technique.

\* \* \* \* \*